Patented Oct. 7, 1941

2,258,184

UNITED STATES PATENT OFFICE 2,258,184

ICE-INHIBITING COMPOSITION

Francis P. Keenoy, Kansas City, Mo., assignor to Henry T. Nolan, Denver, Colo.

No Drawing. Application November 12, 1940, Serial No. 365,211

3 Claims. (Cl. 106—13)

This invention relates to a composition of matter intended for use on outside surfaces of automobile windshields and the like to prevent ice formation, while also being effective for ice removal.

It is an object of the present invention to provide a composition which may be applied readily to a windshield or the like and which will prevent ice formation for protracted periods under icing conditions and will effectively remove ice formed on the windshield.

Another object of the invention is to provide such a composition which is non-injurious to metallic or painted surfaces.

Still another object is to provide a de-icing composition which is economically produced, and which is very efficient in use.

In the description of the invention which follows hereinafter, the preferred proportions of the several ingredients comprising the mixture will be stated, and while it will be apparent as the description proceeds, that variations may be effected within the scope of the invention, it should be noted that to a large degree, the proportions are critical and comprise an important feature of the present invention.

In compounding the composition, the mixture of active ingredients will contain from thirty to seventy-five percent, to which is added water, preferably distilled water, in an amount of from seventy percent to twenty-five percent, which is sufficient to produce a proper viscosity to render the composition readily applicable to the surfaces on which it is used.

While water from domestic supply systems would be satisfactory in the production of proper viscosity or fluidity, most water of this character contains relatively small quantities of salts in solution which have a corrosive action on metallic and painted surfaces, for which reason its use must be avoided.

In the practice of the invention, I have found that good results are obtained by mixing twenty to sixty percent ethylene glycol with two to five percent formaldehyde and eight to ten percent glycerol. To the foregoing mixture there is then added a sufficient quantity of water, as hereinbefore described, to produce a free-flowing composition. The respective ingredients are mutually soluble, and the composition thus produced is a true solution.

The foregoing composition may be applied directly to any surface where ice has formed or where ice formation is expected, and the mixture will forthwith melt or dissolve any adhering ice and prevent further formation thereof, under freezing conditions, for a period of two hours or longer, depending on various factors.

Some of the surfaces effectively treated by the present invention are the exteriors of windshields of automobiles, trucks, streamlined trains, and aircraft, as well as the wings and other exposed surfaces of airplanes where ice formation constitutes a hazard in operation. In fact, any surface subjected to a frosting condition may be effectively treated by the present invention to prevent ice formation or for ice removal, without marring or otherwise injuring such surface.

In producing the mixture of the present invention, I have discovered an unusual and unexpected property. Each of the ingredients: ethylene glycol, glycerol, and formaldehyde is a composition having a relatively low freezing point, but the freezing point of the mixture is lower than the theoretical freezing point determined by the proportions of the ingredients.

From the foregoing, it appears that the ingredients have a modifying action on one another which produces results that cannot be obtained by any one alone, or by any combination of two of the ingredients.

Thus, in my preferred practice of the invention, I mix forty-seven parts distilled water with forty parts ethylene glycol, four parts formaldehyde, and nine parts glycerol, and the freezing point of the mixture is —40° F. It will be understood that changing the proportions of the ingredients will produce variations in the freezing point of the mixture, but within the range stated, corresponding results will be obtained.

The mixture thus obtained is non-inflammable and has no corrosive action on metallic surfaces or the painted or lacquered finishes of vehicles. Therefore, it may be used freely for its intended purpose without fear of subsequent deleterious effects to the surfaces it comes in contact with in use.

The mixture may be applied in any suitable way; as an example, by spraying, rubbing the surface to be treated, by permitting the liquid to drip across such surface, or in any other manner applying a protective coating thereto.

Where it is desired to combine the anti-freeze properties of the composition with the added function of cleansing the surface under treatment, a suitable cleansing agent, such as a soap or the like, may be introduced into the mixture and applied conjointly therewith.

Upon application to frost or ice on a surface to be treated, the mixture begins to act instantly, and in the course of a few seconds, or not to exceed one minute, the ice or frost will melt. Thereafter, so long as such surface is filmed by the mixture, no further frosting or ice deposit will occur.

Changes and modifications may be availed of within the scope of the invention as defined in the hereunto appended claims.

What I claim and desire to secure by Letters Patent is:

1. A composition of the character described, comprising a true solution consisting of a mixture of 20 to 60 parts ethylene glycol, 8 to 10 parts glycerol, and 2 to 5 parts formaldehyde.

2. A composition of the character described, comprising a true solution consisting of a mixture of 40 parts ethylene glycol, 9 parts glycerol, and 4 parts formaldehyde.

3. A composition of the character described, comprising a mixture of 40 parts ethylene glycol, 9 parts glycerol, 4 parts formaldehyde, and 47 parts distilled water.

FRANCIS P. KEENOY.